Jan. 21, 1930. C. L. WEBER 1,744,290
AUTOMATIC CONTROLLER FOR PRESSURE REGULATORS
Filed Jan. 27, 1926 2 Sheets-Sheet 1
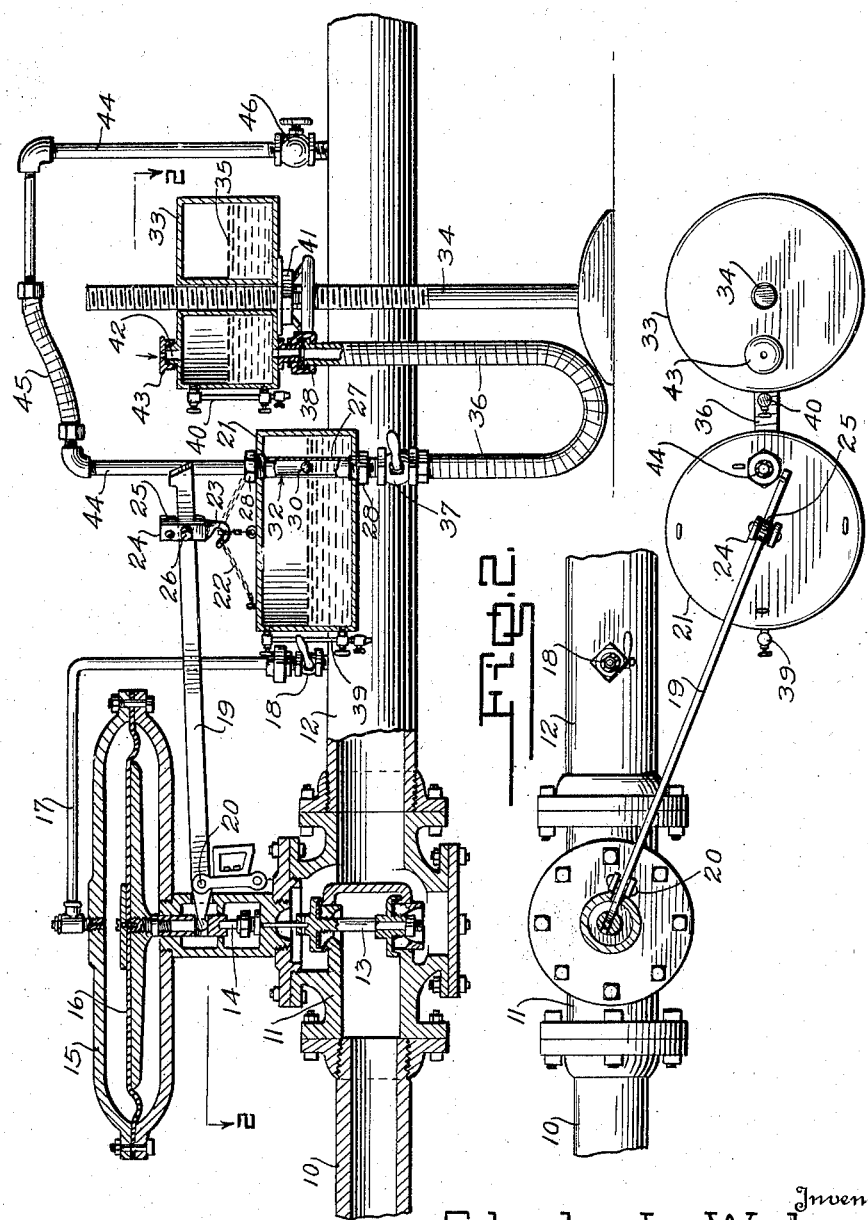
Inventor
Clyde L. Weber
By Lancaster and Allwine
Attorneys Jan. 21, 1930.  C. L. WEBER  1,744,290
AUTOMATIC CONTROLLER FOR PRESSURE REGULATORS
Filed Jan. 27, 1926  2 Sheets-Sheet 2
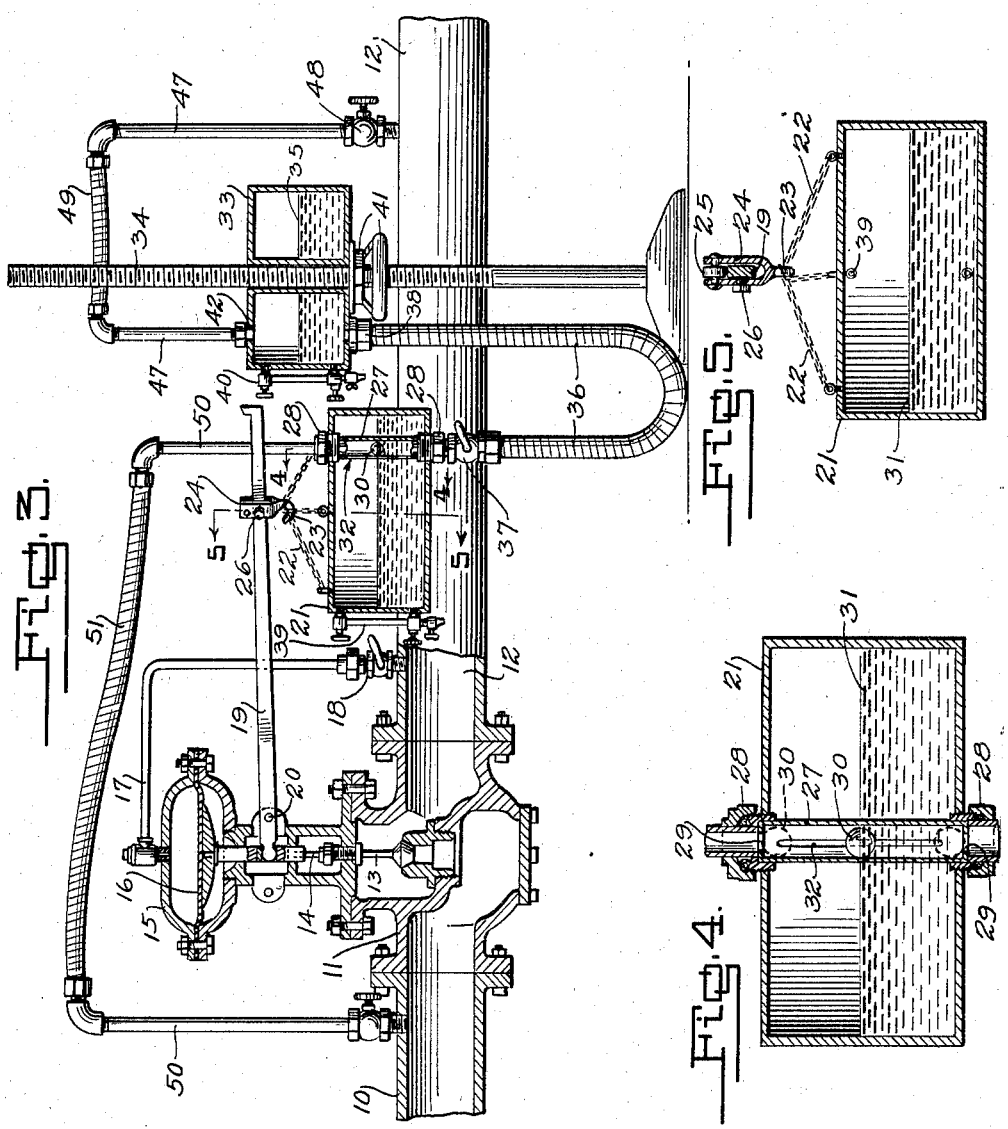
Inventor
Clyde L. Weber Patented Jan. 21, 1930

1,744,290

UNITED STATES PATENT OFFICE

CLYDE L. WEBER, OF CLARKSBURG, WEST VIRGINIA

AUTOMATIC CONTROLLER FOR PRESSURE REGULATORS

Application filed January 27, 1926. Serial No. 84,228.

The present invention relates to pressure regulators, and more particularly to a device for automatically controlling the action of the same.

An object of the present invention is to provide a device for improving the action of a pressure regulator by making the regulator more sensitive, and causing the operation of the regulator to be more uniform and smooth.

Another object of the invention is to provide an automatic controller for pressure regulators which is adjustable to meet varying and required conditions so that the pressure regulator when equipped with the controller is capable of maintaining a steady flow in the main line at a desired pressure.

The invention provides a controlling weight to operate against the effective pressure in the system and which is provided with means for varying the effective force of the weight by means of a fluid, the apparatus being adjustable as to the quantity of the fluid admitted to the weight, and such adjustment being effected automatically by counterbalancing pressure and gravitational forces, the pressure being obtained from the gas line while the gravitational forces being variable by the raising and lowering of a column of liquid disposed in the weight.

The invention pertains to an attachment to that type of pressure regulator which employs a diaphragm or the like connected to a valve in the main line, the diaphragm being in communication with the main to be operated upon an exchange of pressure therein while a weight is utilized for operating the diaphragm and valve in an opposite direction against the pressure against the diaphragm so that a uniform pressure may be maintained at the outlet. This general type of regulator is at present manufactured by the Chaplin-Fulton Mfg. Co., of Pittsburgh, Pennsylvania. The present invention is adapted for use, with but slight modification, to both high and low pressure regulators of the above described general type.

Briefly stated, the present invention aims to provide means for automatically varying the weight of the above described pressure regulator to effect the opening and closing of the valve more quickly than when the diaphragm alone is resorted to as the pressure in the latter instance must be built up to a predetermined height before the weight may be lifted and the diaphragm depressed.

The above, and various other objects and advantages of this invention will in part be brought out in, and in part be understood from, the following detailed description of the present preferred embodiment, the same being illustrated with a slight modification in the accompanying drawings, wherein:

Fig. 1 is a side elevation partly in section of an automatic controller attached to a pressure regulator for maintaining a low pressure.

Fig. 2 is a horizontal section taken through the same on the line 2—2 of Fig. 1.

Fig. 3 is a view similar to Fig. 1 but showing a slightly modified form of automatic controller as applied to a high pressure regulator.

Fig. 4 is a detail enlarged sectional view taken on the line 4—4 of Fig. 3 and showing the valve device and the interior of the variable weight, and Fig. 5 is a similar view taken on the line 5—5 of Fig. 3.

Referring to the drawings, wherein like parts are designated by similar numerals of reference throughout the several views, 10 designates a high pressure pipe line which is connected by a valve casing 11 of any suitable type to a low pressure pipe line 12 wherein it is desired to maintain a steady low pressure and the consumption from which is variable to necessitate a variable feed between the high and low pressure pipes 10 and 12. Fig. 1 of the drawings illustrates one type of pressure regulator for accomplishing this result, and to which the automatic controller of this invention may be applied. As illustrated, the valve casing 11 is provided with a balanced valve 13 having a stem 14 which extends upwardly through the top of the valve casing into a diaphragm casing in which is disposed a diaphargm 16 connected to the upper end of the valve stem 14 for opening and closing the valve as the diaphragm fluctuates.

A pipe 17 leads from the top of the diaphragm casing 15 to the low pressure pipe 12 and is provided with a turning plug or other type of valve 18 to close the pipe 17 in cutting out the operation of the regulator when desired. A lever 19 is suitably pivoted at 20 near its inner end and projects at said inner end into the upper part of the valve casing 11 and has connection with the stem 14 for raising the latter and opening the valve when the lever or arm 19 is swung downwardly at its outer end.

In the present type of pressure regulator, a weight of desired size is mounted for longitudinal adjustment along the arm 19 so as to draw the arm 19 downwardly and lift the valve toward an open position against any pressure that may be built up above the diaphragm 16. While this type of regulator is very efficient and effective for the control of the passage of fluid through the valve casing 11, it lacks that refined adjustment in the operation of the valve as to eliminate pressure fluctuations where the consumption is irregular, or where the pressure in the high pressure pipe 10 is subject to quick change.

In order, therefore, to make more sensitive the action of the valve with its diaphragm and weight arm 19, the present invention provides a means for varying the weight automatically by the direct variation in pressure in the low pressure pipe 12. The present embodiment discloses a hollow weight 21 suspended by chains 22 or the like from a hook 23 which is carried upon the lower end of a slide 24 which may be provided with a roller 25 in its upper end to seat upon the upper edge of the lever arm 19 to permit of the easy shifting of the hollow weight 21 lengthwise on the arm.

A binding or lock screw 26 is carried in one side of the slide 24 for engagement with the lever arm 19 to secure the weight when adjusted. As best shown in Fig. 4, the hollow weight 21 has therein a vertical tube 27 which is secured at top and bottom in stuffing boxes 28 which are secured through the top and bottom walls of the weight 21, and the stuffing boxes are provided therein with valve seats 29 which face inwardly toward each other and adapted to receive thereagainst a float valve 30 in the form of a ball adapted to move up and down in the tube 27. The hollow weight 21 is adapted to receive a body of liquid 31 and the tube 27 is provided in its side with a longitudinal slot 32 or its equivalent for admitting the liquid to the upper and lower ends of the tube 27. The surface level of the body of liquid 31 is thus maintained in the tube 27.

A supply tank 33 is slidably disposed upon a threaded standard 34 mounted adjacent to the weight 21 and is adapted to contain a body of liquid 35. A flexible pipe or hose 36 is connected at one end to the lower stuffing box 28 through the intermediary of a valve 37 while the other end of the flexible tube or pipe 36 is connected by a union 38 to the bottom of the supply tank 33. When the valve 37 is open, the flexible tube or pipe 36 establishes communication between the supply tank 33 and the hollow weight 21 so that the body of liquid 35 may pass into the weight and raise the surface level of the body of liquid 31 and increase the effective weight of the same. The weight 21 is provided with an exterior sight glass or tube 39 while the supply tank 33 is provided with a similar sight tube 40 by means of which the heights of the columns of liquid may be determined in the weight and in the supply tank.

To support the supply tank 33 adjustably upon the standard 34 the latter is provided with a hand wheel or follower 41 threaded upon the standard and engaging the bottom of the supply tank 33 to raise and lower the same, and support the tank in adjusted position. The supply tank 33 is provided in its top with a filler neck 42 which, for low pressure regulators, is equipped with a perforated cap 43 to establish atmospheric communication with the interior upper portion of the supply tank. For low pressure regulators the upper end of the tube 27, and consequently the upper end of the weight 21 is connected by a pipe 44 to the low pressure pipe 12, the pipe 44 having a flexible section 45 therein to permit free movement of the weight 21, and provided with a valve 46 by means of which the pipe 44 may be closed.

In order to set the automatic controller and regulator, the tank 33 is half filled with mercury, or some other suitable liquid, such as an antifreezing mixture if desired. The valve 37 is closed and the hollow weight 21 is placed on beam or lever arm 19 and adjusted lengthwise thereof to give the required pressure on the low side of the regulator. The valve 37 is now opened and the supply tank 33 is raised or lowered on its standard 34 until the liquid level in the hollow weight 21 shows on the gauge tube 39 that the weight is approximately half full of the liquid. Of course the weight is primarily filled to the desired height through the pipe 36 as the supply tank 33 is filled by the removal of the cap 43. When hollow weight 21, is half full, replenish the supply in tank 33 to one half full,—in other words, in setting regulators have both hollow weight 21 and tank 33 each half full.

An increase in the pressure of gas or fluid in the pipe 12 causes a back pressure through the pipe 44 into the top of the weight with a consequent increase in the surface pressure of the body of liquid 31 in the hollow weight. The pressure is transmitted through the flexible pipe 36 and a quantity of the liquid 31 is forced upwardly into the supply tank 33. This quickly reduces the weight and consequently the lever arm 19 may be more easily elevated so that the increase in pressure through the pipe 17 need only be slight to depress the diaphragm 16 and move the valve 13 toward a closed position. Whenever the pressure is reduced in the pipe 12, the liquid 31 is permitted to rise in the hollow weight 21 and increase the effectiveness of the weight for pulling down the lever arm 19 against the same or slightly reduced pressure maintained in the top of the diaphragm casing 15. Should the back pressure in the pipe 44 be sufficient to expel all of the liquid in the weight 21, the float valve 30 drops in the tube 27 and engages the lower valve seat 29 to close the upper end of the pipe 36 and prevent the fluid from blowing backwardly through the apparatus. If, on the other hand, the pressure in the pipe 44 does not offer enough resistance to the liquid 31 in the weight 21, the liquid 31 will fill the container and raise the floating ball or valve 30 into contact with the upper valve seat 29 closing the entrance to pipe 44 and preventing loss of the liquid 31.

The object in adjusting the height of the supply tank 33 is to raise the liquid body 35 therein to such height as to produce a pressure counter to the fluid pressure in the pipe 44.

In the modified form disclosed in Fig. 3, the automatic controller is applied to a high pressure regulator, the modifications being merely in the connections of the upper ends of the hollow weight 21 and the supply tank 33. The filler neck 42 at the top of the supply tank 33 is connected to a pipe 47 which leads to the low pressure pipe 12 and is provided with a hand valve 48. The pipe 47 is also provided with a flexible section 49 permitting the free adjustment of the tank 33 on its standard 34. The upper stuffing box 28 at the top of the weight 21 is connected to a pipe 50 which leads to the high pressure pipe 10 and is provided with a flexible section 51 permitting the free vertical and horizontal movements of the weight 21.

The operation of this form of the invention is substantially the same as above described with the exception that the differential pressure between the high pressure pipe 10 and the low pressure pipe 12 is utilized in shifting the body of fluid between the hollow weight 21 and the supply tank 33 to vary the quantity of liquid in the weight 21 and therefore vary the effective weight imposed upon the lever arm 19.

It is of course understood that various changes and modifications may be made in the details of construction and design of the above specifically described forms of the automatic controllers for pressure regulators of the high and low pressure type, without departing from the spirit of the invention and restricted only by the scope of the following claims.

What is claimed is:

1. An automatic controller for pressure regulators having a weight beam, comprising a hollow weight for adjustment on the weight beam, a liquid supply tank arranged adjacent to the weight, a connection between the tank and the weight for permitting the transfer of liquid back and forth between the tank and the weight, a guide tube arranged in the hollow weight and communicating at its opposite ends therewith and connected at one end to said connection from the tank, a pressure pipe connected at one end to the top of said guide tube and adapted for connection at its other end to one side of a pressure regulator, said guide tube having valve seats at opposite ends, and a float valve housed in the tube to rise and fall with the surface level of the liquid therein, said float valve engaging the lower valve seat when the liquid is exhausted from the weight to prevent blowing from the pressure regulator through the weight, and said valve adapted to engage the upper seat when the liquid fills the weight to prevent escape of liquid from the weight.

2. An automatic controller for pressure regulators having a weight beam, comprising a hollow weight adjustable along said beam, a liquid supply tank connected to the weight for transferring liquid thereto, a back pressure pipe carried upon the upper end of the supply tank connected with the low pressure side of the pressure regulator, and a second back pressure pipe carried upon the upper end of the hollow weight connected with the high pressure side of the pressure regulator, whereby the varying pressure at the low side of the pressure regulator may effect transference of the fluid back and forth between the hollow weight and the tank to vary the effective pressure of the weight on said beam.

3. An automatic controller for pressure regulators including a weight beam, comprising, a hollow weight on the beam, a liquid supply tank, a connection between the tank and bottom of the weight for permitting the transfer of liquid back and forth between the two, a valve seat at the opening of said connection at the bottom of the weight, a pressure pipe connected at one end to the top of the weight and adapted for connection at its other end to one side of the pressure regulator, a valve seat at the opening of said pressure pipe at the top of the weight, and valve means cooperating with said valve seats and operable by the liquid level in the weight to close off said openings respectively at minimum and maximum liquid supply in said weight.

CLYDE L. WEBER.